(12) United States Patent
Lizon et al.

(10) Patent No.: US 7,114,390 B2
(45) Date of Patent: Oct. 3, 2006

(54) ULTRASONIC LIQUID LEVEL MONITOR

(75) Inventors: David C. Lizon, Rio Rancho, NM (US); Gregory Kaduchak, Los Alamos, NM (US); Dipen N. Sinha, Los Alamos, NM (US)

(73) Assignee: Adept Science & Technologies, LLC, Los Alamos, NM (US)

( * ) Notice: Subject to any disclaimer, the term of this patent is extended or adjusted under 35 U.S.C. 154(b) by 0 days.

(21) Appl. No.: 10/780,071

(22) Filed: Feb. 17, 2004

(65) Prior Publication Data

US 2004/0173021 A1    Sep. 9, 2004

Related U.S. Application Data

(60) Provisional application No. 60/448,180, filed on Feb. 14, 2003.

(51) Int. Cl.
*G01F 23/00*    (2006.01)

(52) U.S. Cl. .................. 73/290 V; 73/290 R
(58) Field of Classification Search .............. 73/290 V, 73/290 R
See application file for complete search history.

(56) References Cited

U.S. PATENT DOCUMENTS

| | | | | |
|---|---|---|---|---|
| 2,883,861 A * | 4/1959 | Van Valkenburg et al. | .................. | 73/290 R |
| 3,100,885 A * | 8/1963 | Welkowitz et al. | .......... | 367/95 |
| 3,110,890 A * | 11/1963 | Westcott et al. | ............ | 340/621 |
| 3,163,843 A * | 12/1964 | Dieckamp | ................. | 73/290 V |
| 3,447,374 A * | 6/1969 | Cohn et al. | ............... | 73/290 R |
| 3,603,149 A * | 9/1971 | McKown | ................. | 73/290 V |
| 3,924,454 A * | 12/1975 | McElroy et al. | .............. | 73/628 |
| 4,144,517 A * | 3/1979 | Baumoel | ..................... | 367/93 |
| 4,280,126 A * | 7/1981 | White | ........................ | 340/621 |
| 5,065,624 A * | 11/1991 | Fell | ............................ | 73/290 V |
| 5,191,795 A * | 3/1993 | Fellingham et al. | .......... | 73/599 |
| 5,303,585 A * | 4/1994 | Lichte | ..................... | 73/290 V |
| 5,400,376 A | 3/1995 | Trudeau | | |
| 5,440,310 A * | 8/1995 | Schreiner | .................... | 342/124 |
| 5,586,085 A * | 12/1996 | Lichte | ......................... | 367/99 |
| 5,697,248 A | 12/1997 | Brown | | |
| 5,755,136 A * | 5/1998 | Getman et al. | ........... | 73/290 V |
| 5,767,407 A | 6/1998 | Sinha | | |
| 5,793,705 A | 8/1998 | Gazis et al. | | |
| 5,799,534 A | 9/1998 | Van der Pol | | |
| 5,827,943 A | 10/1998 | Schmidt | | |
| 5,836,192 A * | 11/1998 | Getman et al. | ........... | 73/290 V |
| 5,877,997 A | 3/1999 | Fell | | |
| 5,996,406 A * | 12/1999 | Ward | ........................ | 73/290 R |

(Continued)

OTHER PUBLICATIONS

International Search Report dated Apr. 22, 2005.

*Primary Examiner*—Hezron Williams
*Assistant Examiner*—Rodney Frank
(74) *Attorney, Agent, or Firm*—Cochran Freund & Young LLC; Samuel M. Freund

(57) ABSTRACT

The present invention includes an apparatus and method for continuous and point level liquid level detection in a closed container or pipe having an inaccessible interior volume such that it is difficult to retrofit these tanks with a level gauge that operates within the storage volume. The invention is based on a frequency domain analysis of the combined storage tank/fluid or pipe/fluid response to localized ultrasonic energy, and can be implemented using several excitation and signal analysis procedures, taking advantage of the transmission properties of the vessel wall in the vicinity of one of its longitudinal thickness resonances. Thus, significantly lower peak excitation voltages are required than with pulse-echo ultrasonic techniques.

20 Claims, 6 Drawing Sheets

U.S. PATENT DOCUMENTS

| | | |
|---|---|---|
| 5,996,407 A | 12/1999 | Hewitt |
| 6,053,041 A | 4/2000 | Sinha |
| 6,427,532 B1 | 8/2002 | Keller |
| 6,644,119 B1 * | 11/2003 | Sinha .......................... 73/579 |
| 6,889,560 B1 * | 5/2005 | Sinha ...................... 73/861.25 |
| 2003/0015036 A1 * | 1/2003 | Young et al. .................. 73/579 |

* cited by examiner

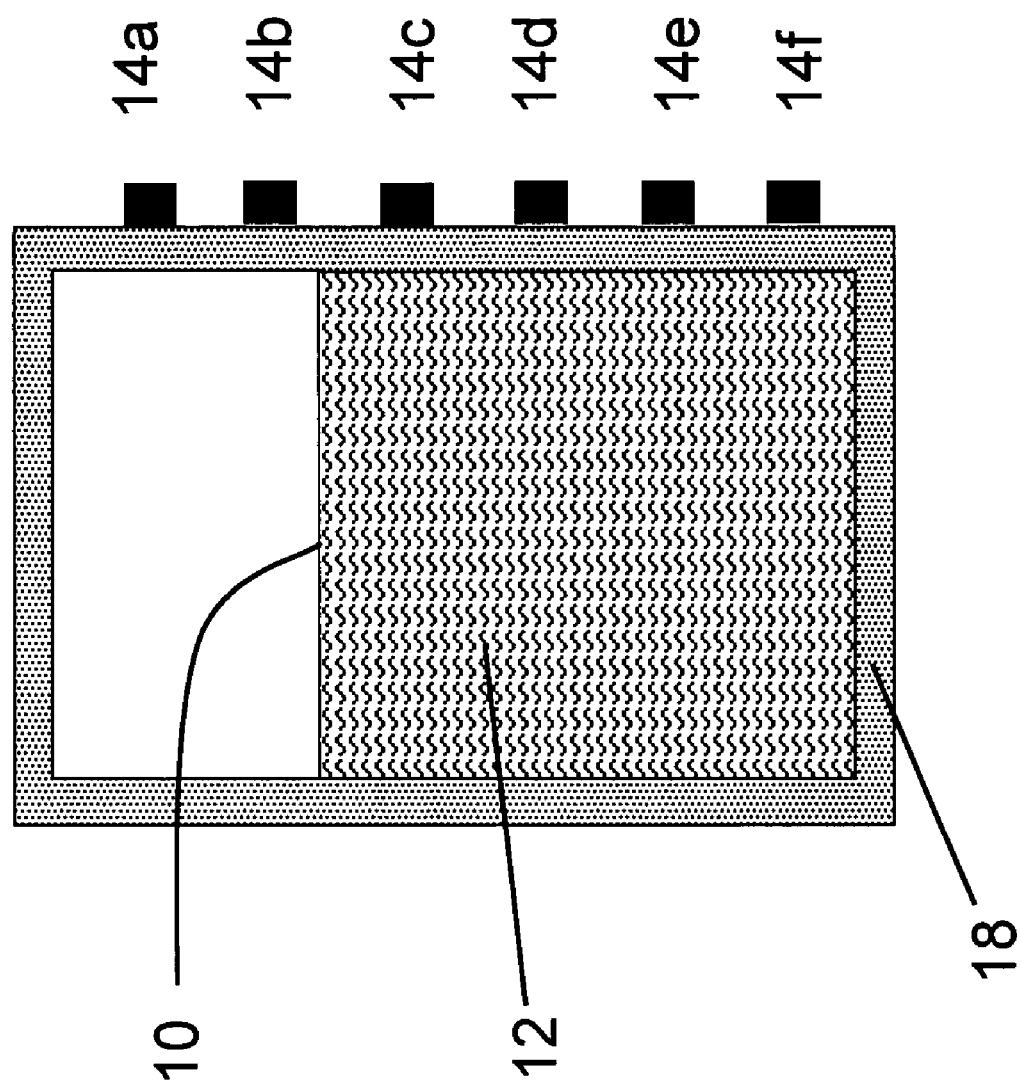

ULTRASONIC LIQUID LEVEL MONITOR

RELATED CASES

The present application claims the benefit of Provisional Patent Application Ser. No. 60/448,180, for "Non-Invasive Ultrasonic Liquid Level Monitor" filed on Feb. 14, 2003.

FIELD OF THE INVENTION

The present invention relates generally to determining liquid level in containers and, more particularly, to the use of ultrasound to non-invasively determine liquid level.

BACKGROUND OF THE INVENTION

There is a continuing need for monitoring levels of liquids stored in closed containers in a noninvasive manner and without regard to the type of liquid being stored. Existing acoustical methods for level determination rely on a localized pressure disturbance generated using a transducer, and propagated through the storage material. The disturbance is reflected from the surface of the liquid and received near to the original transduction point. The period between transmission and reception is measured and the liquid level determined by the equation:

$$\text{Level} = \frac{c\Delta t}{2}, \quad (1)$$

where c is the propagation speed of a sound wave in the liquid and $\Delta t$ is the amount of time elapsed between the generation and reception of the sound disturbance. The factor of two is a result of the sound disturbance traversing the liquid column twice: transmitter to reflector, and reflector to receiver. Pulse-echo, pitch-catch, and tone-burst methods of acoustic ranging are included in such measurements.

U.S. Patents for acoustic level detection in the time domain include: U.S. Pat. No. 6,427,532 for "Device For Measuring A Fill Level Of A Liquid In A Container," which issued to Dieter Keller on Aug. 6, 2002; U.S. Pat. No. 5,99,407 for "Multi-Frequency Ultrasonic Liquid Level Gauging System," which issued to Martin Hewitt on Dec. 7, 1999; U.S. Pat. No. 5,877,997 for "Pulse Echo Distance Measurement," which issued to Roger Fell on Mar. 2, 1999; U.S. Pat. No. 5,827,943, Gazis for "Method For Calibration In Level Measurement," which issued to Helmut Schmidt on Oct. 27, 1998; U.S. Pat. No. 5,793,705 for "Ultrasonic Liquid Level Gauge For Tanks Subject To Movement And Vibration," which issued to Denos Constantinos Gazis et al. on Aug. 11, 1998; U.S. Pat. No. 5,697,248 for "Liquid Level Sensor," which issued to Richard Hunter Brown on Dec. 16, 1997, and U.S. Pat. No. 5,400,376 for "Ultrasonic Fuel Gauging System Using State machine Control," which issued to Christian L. Trudeau on Mar. 21, 1995.

A Frequency Modulated Continuous-Wave (FMCW) process using pseudo-frequency domain level detection is described in U.S. Pat. No. 5,799,534 for "Procedure For measuring The Level Of A Liquid In A Tank According To The Radar Principle," which issued to Ronald van der Pol on Sep. 01, 1998. This technique is used in radar range-finding, and the liquid level is determined by observing reflections from the liquid surface of ultrasonic signals generated outside of the liquid.

In U.S. Pat. No. 6,053,041 for "Noninvasive Method For Determining Liquid Level And Density Inside Of A Container," which issued to Dipen N. Sinha on Apr. 25, 2000, flexural acoustic waves are generated in the shell of a container holding the liquid and the phase difference between the detected flexural wave propagated through the shell from that of the originally generated wave is measured a chosen distance from the location of the generated wave. The generation and detection means are moved over the outer surface of the vessel, and a change in the phase difference indicates that a liquid/vapor interface has been crossed, thereby identifying the liquid level. In another embodiment, continuous liquid level measurements were made using an apparatus where one transducer was disposed near the top of the container, and a second transducer was disposed near to the bottom thereof. The time of flight of a tone burst transmitted from one transducer and received by the other was found to change linearly with liquid level since the sound speed of the wall flexural mode depends on whether the wall is in contact with a liquid. The liquid level was obtained by calibrating the time of propagation of the flexural wave as a function of the amount of wall exposed to the liquid.

In U.S. Pat. No. 5,767,407 for "Noninvasive Identification Of Fluids By Swept-Frequency Acoustic Interferometry," which issued to Dipen N. Sinha on Jun. 16, 1998, a method for noninvasive identification and monitoring of chemicals in sealed containers is described, where direct access to the chemical is not possible. External transducers are used to introduce a standing-wave ultrasonic vibrational pattern into the fluid over a range of frequencies. Liquid characteristics are determined from the peak spacing in the interference pattern, the peak attenuation, the peak width, and the frequency dependence of the peak width.

Accordingly, it is an object of the present invention to provide a method for noninvasively determining the liquid level for a variety of stored liquids.

Another object of the present invention is to provide a method for determining the level of liquids stored in a variety of containers.

Yet another object of the invention is to provide a method for noninvasively determining the liquid level for flammable stored liquids.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus for measuring liquid level in a container hereof includes a transducer in physical contact with the outside of a wall of said container located below the surface of the liquid for generating at least two acoustic resonance responses in the liquid substantially perpendicular to the surface; a sweep generator for electrically exciting the transducer over a chosen range of acoustical frequencies with a chosen waveform; and a receiver for determining the frequencies of the at least two resonant responses.

In another aspect of the present invention, in accordance with its objects and purposes the method for measuring liquid level in a container hereof includes generating at least two acoustic resonances in the liquid substantially perpendicular to the surface of the liquid; and determining the frequency of the at least two acoustic resonances.

In yet another aspect of the present invention, in accordance with its objects and purposes the apparatus for measuring liquid level in a container hereof includes a transducer in physical contact with the outside of a wall of the container located below the surface of the liquid for generating acoustic resonance responses in the liquid substantially parallel to the surface; a generator for electrically exciting said transducer; and a receiver for detecting the presence of resonant responses from the liquid.

In still another aspect of the present invention, in accordance with its objects and purposes the method for measuring liquid level in a container hereof includes generating at least two acoustic resonances in the liquid substantially parallel to the surface of the liquid; and detecting the presence of acoustic resonances from the liquid.

Benefits and advantages of the present invention include a method for noninvasively determining the liquid level for a variety of stored liquids in a variety of containers.

BRIEF DESCRIPTION OF THE DRAWINGS

The accompanying drawings, which are incorporated in and form a part of the specification, illustrate the embodiments of the present invention and, together with the description, serve to explain the principles of the invention.

FIG. 2a is a graph of spectral data from a 1000 gallon propane tank having a diameter of 1 m, where the frequency sweep is centered near the longitudinal thickness resonance of the tank wall at ~345 kHz, while FIG. 2(b) is an FFT (Fast Fourier Transform) of the spectral data shown in FIG. 2(a).

FIG. 6 is a schematic representation of a pseudo-continuous level monitor, where a plurality of point level sensors is placed on the wall of a storage container for discrete level sensing.

DETAILED DESCRIPTION

Briefly, the present invention includes an acoustic-based, frequency domain apparatus and method for liquid level detection. In what follows, the term acoustic is considered to include both low-frequency sound waves and ultrasonic sound waves (that is, sound waves $\geq 20$ kHz).

Figure 1:
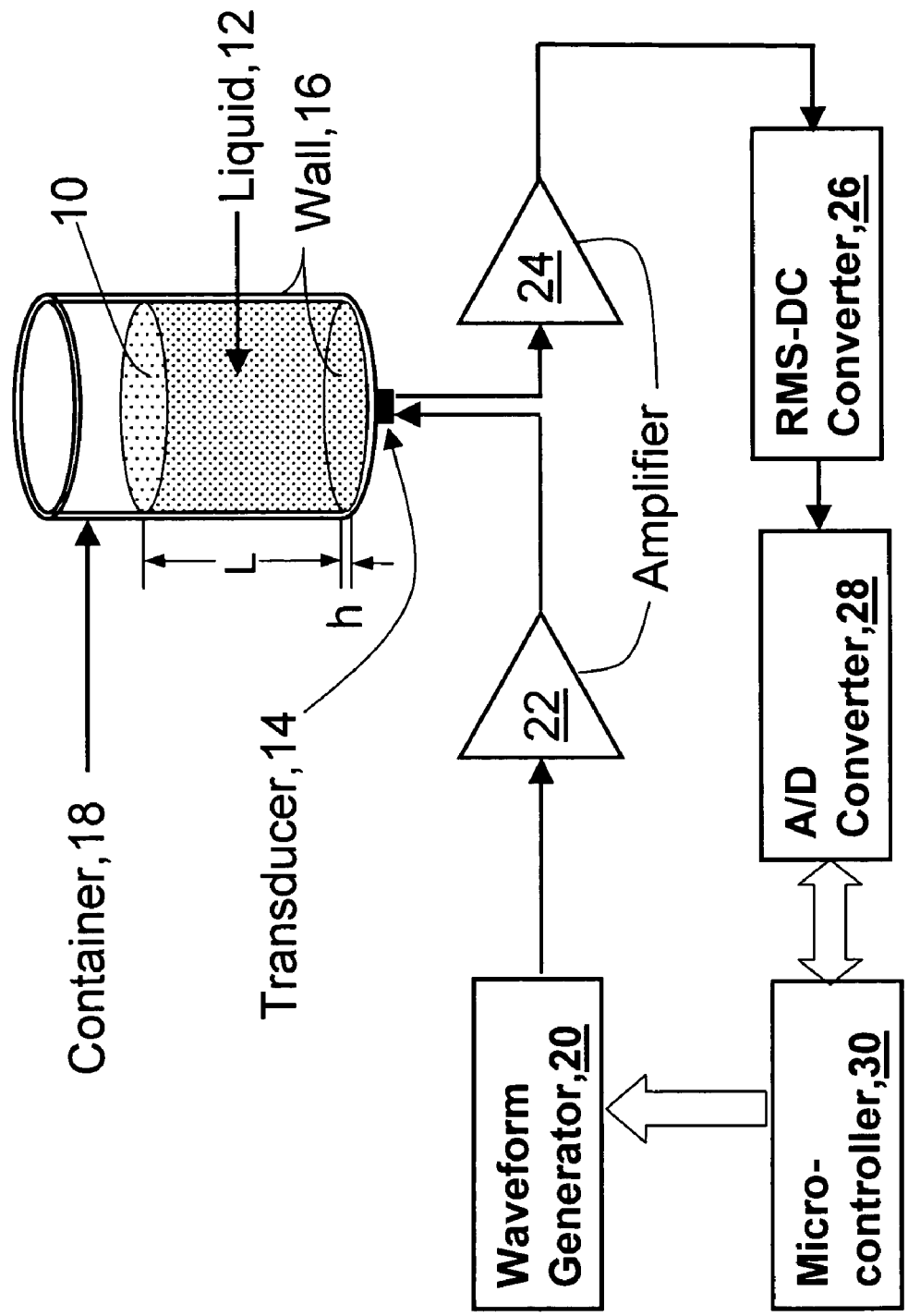
FIG. 1 is a schematic representation of one embodiment of the apparatus of the present invention showing the acoustic cavity formed by the surface of the liquid acting as a reflector of acoustic energy and the collocated transmitter/receiver transducer pair such that acoustic energy is propagated from the transmitter and reflected to the receiver.

Reference will now be made in detail to the present preferred embodiments of the invention, examples of which are illustrated in the accompanying drawings. In what follows, identical or similar structure will be identified using identical callouts. Turning now to the drawings, FIG. 1 is a schematic representation of one embodiment of the apparatus of the present invention where standing waves are generated in an acoustic cavity formed by the surface of the liquid acting as a reflector and a transducer for introducing vibrational energy into the liquid external to and through a wall of the container holding the liquid. The standing waves are detected using a transducer either located nearby to, or collocated with the energy transmitting transducer, or by the energy transmitting transducer itself, and the response of the system is measured as a function of frequency.

Shown in FIG. 1, is a resonant cavity formed by surface, 10, of liquid, 12, and a single piezoelectric crystal transducer unit, 14, which includes both a transmitter of acoustical energy into liquid 12 and a concentrically located receiver of the resonant response thereto, located directly below surface 10 and exterior to wall, 16, of container, 18. Individual, side-by-side transducers can also be used, as can a single transducer to achieve the same result. A bridge circuit used to implement the single transducer embodiment is described in U.S. Pat. No. 5,886,262 for "Apparatus And Method For Comparing Corresponding Acoustic Resonances In Liquids," which issued to Dipen N. Sinha on Mar. 23, 1999, the teachings of which reference are hereby incorporated by reference herein. Surface 10 and transducer 14 are separated by distance L+h, where L is the distance between surface 10 and the inside of the container, and h is the thickness of the portion of wall 16 to which transducer 14 is affixed. Two piezoelectric transducers, one acting as an acoustic energy transmitter and the other as a receiver, can be used to achieve a similar result. Electrical sine-wave excitation at acoustic frequencies generated by waveform generator, 20, and amplified by amplifier, 22, is applied to transducer 14 where an acoustic disturbance is generated in liquid 12 through wall 16. The response of the liquid to this excitation is observed using transducer 14, the signal therefrom being amplified by amplifier, 24. The amplified signal is directed into rms-dc converter, 26, and then to A/D converter, 28. Microcontroller, 30, receives the data from A/D converter 28, both processes the information and controls the waveform generator such that an appropriate sweep is generated. Acoustic resonances occur within the resonator cavity as a result of constructive interference at excitation frequencies such that the length of the cavity equals an integral number of half-wavelength of the sound waves introduced into the cavity.

Figure 2:
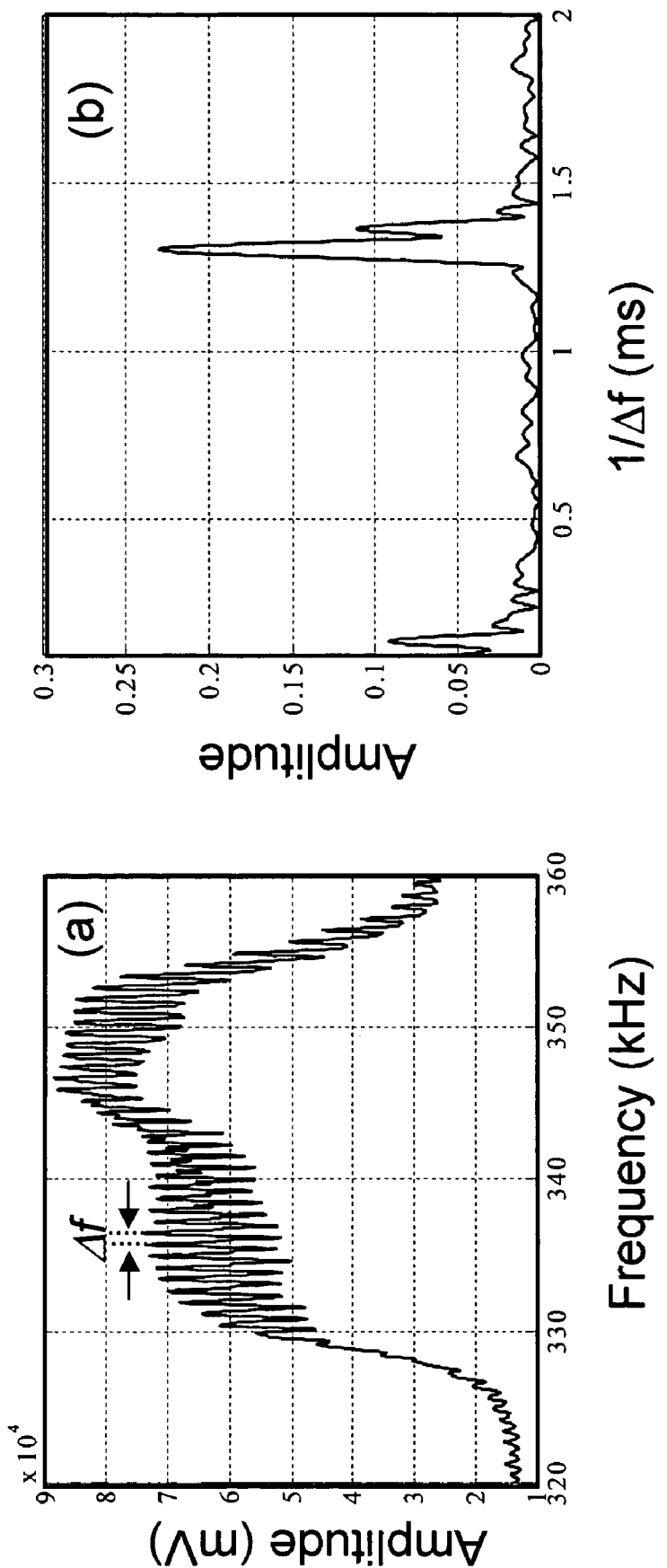

The present invention finds use as a noninvasive apparatus and method for determining liquid level in a closed container. The spectral response of the present apparatus is a superposition of the resonance peaks associated with resonance across the liquid length L and the resonance that occurs across the wall thickness h. An example of such a superimposed spectrum is shown in FIG. 2a which is a graph of spectral data (received signal amplitude in volts plotted as a function of applied frequency) from a 1000 gallon closed propane tank having a diameter of 1 m, where the frequency sweep is centered near a single longitudinal thickness resonance of the tank wall at about 345 kHz. The spectrum includes equally spaced resonance peaks associated with acoustic resonances in the liquid cavity, and the spacing $\Delta f$ is seen to be approximately 740 Hz. FIG. 2(b) is a fast Fourier transform (FFT) of the spectral data shown in FIG. 2(a), the output of the FFT exhibiting the periodicity of FIG. 2(a) as the large peak near 1.35 kHz$^{-1}$. In this measurement, the frequency is discretely stepped over the frequency range. The time spent at each frequency is of a length or duration to allow the system to reach a steady state.

The resonance peaks associated with the wall are typically well separated in frequency (only one wall feature is shown in FIG. 2a hereof), and the resonance peaks associated with the liquid are easily discerned in the regions near the maxima of the wall peaks. The wall thickness h may be determined by the equation $$h = \frac{c_w}{2\Delta F} \quad (2)$$

where $c_w$ is the speed of sound in the wall material and $\Delta F$ is the spacing between resonance peaks associated with resonance occurring in the wall. The complex shape of the wall feature is a result of the physical properties of the tank employed for the measurements.

Little power is required for a typical measurement. The cavity provides a mechanical gain proportional to the Quality factor, Q, of the cavity for steady-state signals; oscillations within the cavity build up over time resulting in large energy densities within the cavity. This permits lower input voltages to drive the transducer as well as much larger signal-to-noise ratios for the received signals. The location of the wall resonance is a manifestation of this signal gain.

Sound transmission through a metal plate having thickness, h (the wall of the container in the present situation), is maximized at the frequency of the wall thickness mode resonance. This resonance has a certain width and this depends on wall geometry, wall material properties, and transducer coupling. It has been observed by the present inventors that the liquid peaks resulting from standing waves generated between the inner surface of the container wall and the liquid surface are most prominent when the excitation frequency is chosen to be within the frequency range corresponding to the width of the wall resonance. It is believed by the present inventors that sound transmission through the wall reaches a maximum in this frequency range, and energy is transmitted into the liquid filled cavity with higher efficiency. For frequencies outside of this range the observed resonance peaks within the liquid rapidly diminish in size, and often cannot be observed. As a result, the measurements described herein are restricted to frequencies which are within the range of a wall resonance peak width. It should be noted that there are multiple wall resonances and the measurements can be made at any of these wall resonances depending on the bandwidth of the transducers used. This effect is demonstrated in FIG. 2a where it is seen that the largest response of the apparatus occurs near to the peak of a wall resonance. As a result, by making measurements near a wall resonance frequency, greater efficiency is obtained, and low excitation voltages (approximately 1 V rms) can be used. These low voltages permit measurements to be safely made in the presence of flammable liquids, since the likelihood of sparking is diminished. Wall resonance frequencies are readily obtained using Eq. 2.

The width of the wall resonances also depends on the liquid properties (essentially the acoustic impedance mismatch between the wall and the liquid inside). The linewidths for the liquid result from a combination of sound absorption in the liquid and the acoustic impedance mismatch. Since the measurement of the present invention involves the speed of sound (the resonance peak spacing), the liquid linewidths are of secondary importance. By contrast, the wall resonance width does need to be considered, since wider wall resonances permit a greater number of liquid resonance features to be clearly observed. In practice, the wall resonance width is generally observed to be sufficient for the required measurements to determine the height of the liquid from the frequency spacing (derived from the FFT of the data).

The small periodic peaks are manifestations of the resonance condition in the liquid, and are spaced apart in frequency by a spacing, $\Delta f$, related to the length of the cavity L by the equation:

$$L = \frac{c}{2\Delta f}. \quad (3)$$

"With the knowledge of the sound speed, c, of the liquid (C=780 m/s for propane) and a measurement of $\Delta f$ from the spectral response, the distance between the interior of the wall on which the transmitter pair is affixed and the liquid surface is readily continuously determined from Eq. 3, thereby permitting a continuous fluid liquid level to be measured and monitored. For the measurement shown in FIG. 2a hereof, this yields a level of approximately 0.52 m, or a nearly half-full level for the tank employed. The sound speed in propane has a well-known temperature dependence. Therefore, once the temperature of the fluid within a container is determined, the appropriate sound speed for determining the liquid level can be chosen."

By taking the fast Fourier transform (FFT) of the spectral response of FIG. 2(a), one may also determine $\Delta f$. The Fourier transform yields the principal periodicities in a waveform and the dominant periodicity, $\Delta f$, from the data in FIG. 2(a) is shown in FIG. 2b. Here the largest peak in the plot near $1/\Delta f \sim 1.35$ kHz$^{-1}$ corresponds to the largest spectral contributor and thus corresponds to the value of $\Delta f$ for use in Eq.(3).

In another embodiment of the invention, the spectral information related to the height of the liquid column is obtained by exciting transducer 14 of FIG. 1 hereof with a continuous frequency modulated waveform voltage excitation, V(t), having the form:

$$V(t) = \sin\left(2\pi\left(f_o + \frac{1}{2}\alpha t\right)t\right), \quad (4)$$

where $f_o$ is the initial frequency of the swept waveform and $\alpha$ is related to the rate of change of the instantaneous frequency. Since the instantaneous frequency of the waveform is a function of time, frequency dependent information about the system response will be time dependent. If the applied excitation is of sufficient temporal length to permit multiple reflections between the liquid surface and the wall upon which the transducer is affixed to occur within the liquid, the received signal will display a periodic amplitude modulation. An example of a demodulated, received signal is shown in FIG. 3, where the period, $\Delta T$, may be used to determine the level of the fluid in the tank from the equation:

$$L = \frac{c}{\alpha \Delta T}. \quad (5)$$

Figure 3:
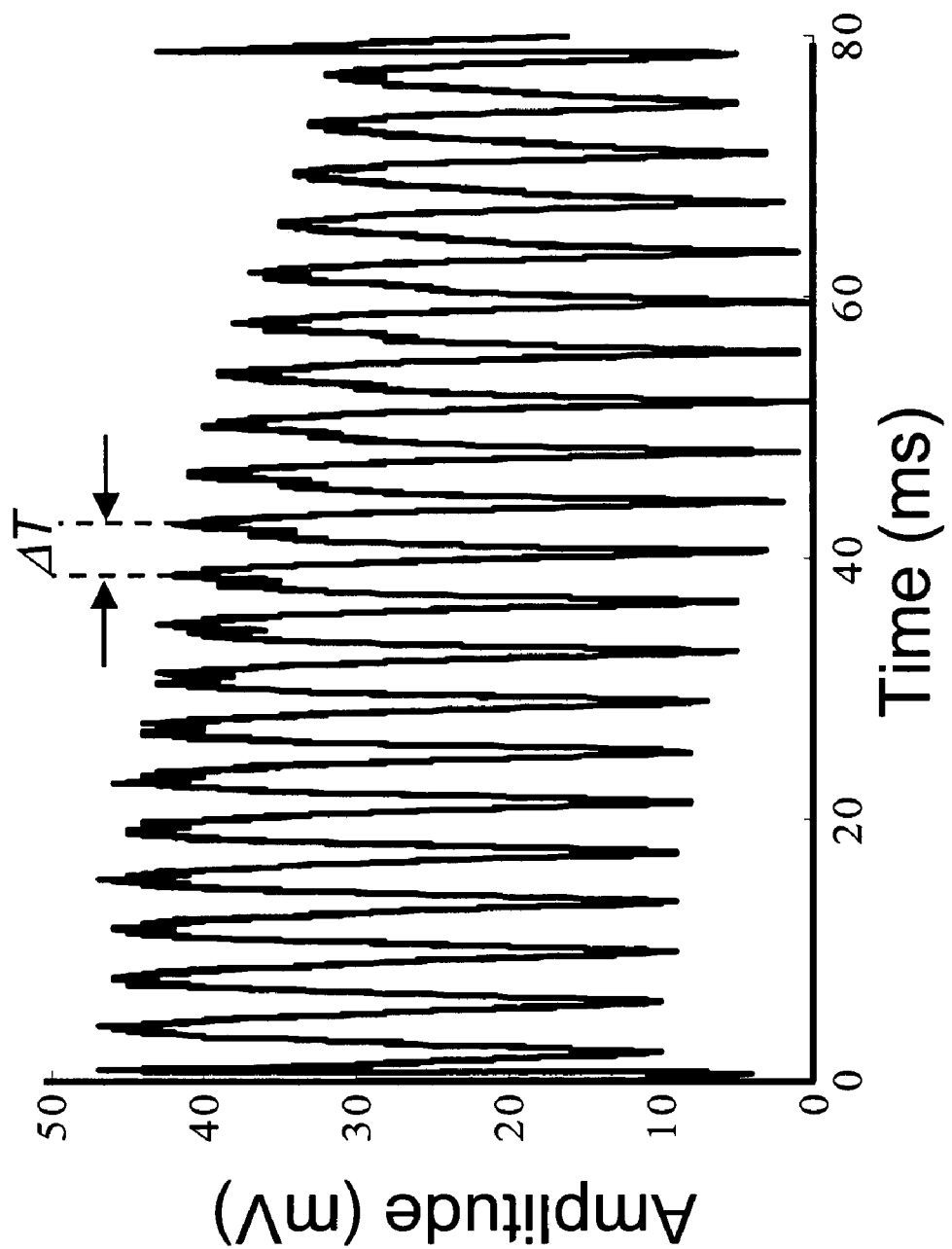
FIG. 3 is a graph of the received, rectified, low-pass filtered chirp signal, where the period spacing, $\Delta T$, is used to determine the level of the fluid in the tank.

A rectified, low-pass filtered received signal is shown as a function of time in FIG. 3 hereof, and is seen to be a periodic train of peaks and valleys. The peaks correspond to constructive interference of the multiply reflected signal in the tank volume. As with the determination of $\Delta f$, there are several ways to determine the spacing $\Delta T$ from the signal in FIG. 3 in order to measure L. For example, if the transmitted signal has a value of $\alpha=3.3\times10^6$ Hz/s$^2$. The measured value for $\Delta T$ is 3.7 ms. The sound speed of the liquid (water) in the tank is c=1640 m/s yielding a level L=1640/(3.3×10$^6$×3.7× 10$^{-3}$)=0.134m.

The use of the excitation described in Eq. 4 has the advantage over the swept frequency procedure in that data acquisition is much more rapid. During a frequency sweep in accordance with the swept frequency method, a steady state resonance condition is permitted to occur at each frequency. Thus, at every chosen frequency, the acoustic wave in the liquid is allowed to reach steady state, which takes at least a few milliseconds. A frequency sweep measurement on a typical tank takes between 30 s to 1 min. The excitation described in Eq. 4, by contrast, contains all frequencies, and a single measurement is all that is necessary. A liquid level measurement can be obtained in under 1 s (depending on the fidelity of the electronics). Another advantage emerges if the fluid level is not stationary; that is, it may vary as a result of ground vibrations, wind, fluid being introduced into the container or drained therefrom, etc. Since the excitation voltage of Eq. 4 requires one transmitted signal as opposed to a signal for each frequency, any level variations occurring in greater than a few milliseconds will not affect the measurement. For a sweep measurement, however, it is necessary that the level be stationary for approximately 30 s.

It should be mentioned that depending on the overall geometry and material of the container, resonance peaks may exist in the spectrum when the fluid level is below the transmitter/receiver. However, the periodic spacing $\Delta f$ as determined by Eq.(3) hereof will, in most cases, not be present. It should also be mentioned that the location of the transmitter and receiver need not be collocated on the container. For this application, it is only necessary that the sound disturbance that propagates from the transmitter be intersected by the receiver. For example, a transmitter/ receiver geometry where the receiver is on the opposite side of the container from the transmitter would achieve the required result.

Figure 4:
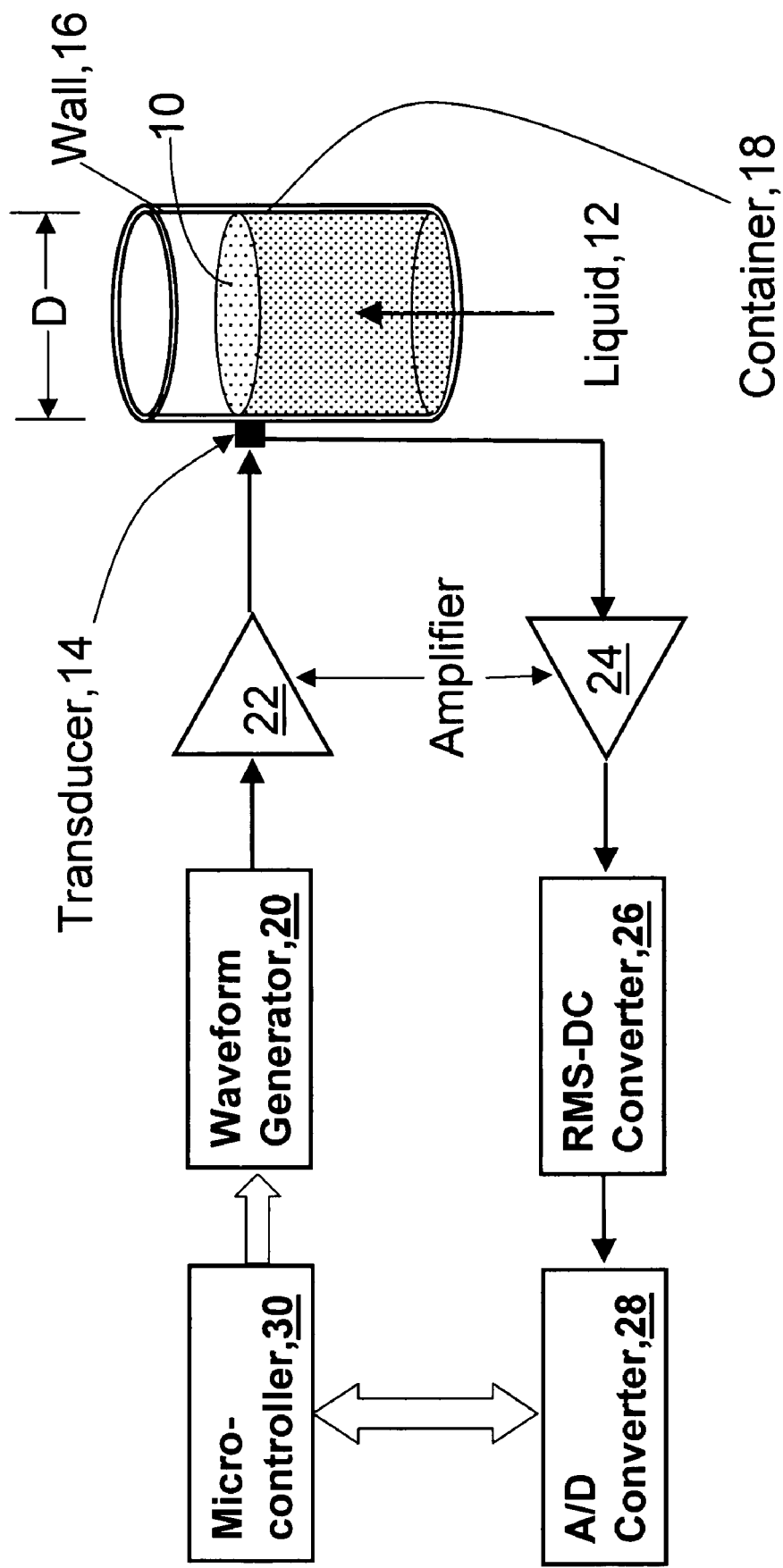
FIG. 4 is a schematic representation of an apparatus for point level sensing where the transmitter and receiver sensors are affixed in a collocated manner to the side of the tank, such that when the liquid level is above the sensor, resonance peaks are readily observed at the receiving transducer, while when the liquid level is below the sensors, resonance peaks are markedly diminished in size or are unobservable.

In another embodiment of the invention, a point level detection procedure where transmitter/receiver pair 14 is attached to a side wall of cylindrical container 18, and the opposing side wall of the container serves as a rigid reflector located a distance D from transducer 14, is shown in FIG. 4. Clearly, other geometries for the container are possible in accordance with the teachings of the present invention; that is, the term container is taken to include open vessels, closed vessels and pipe configurations containing flowing liquids. In the situation where the level of a flowing liquid is to be measured, the liquid surface must have a horizontal portion (the liquid surface) and be substantially free of oscillations during the measurement period (see the discussion hereinabove relating to Eq. 4). The transmitter and receiver functions of transducer 14 can also be disposed on opposite sides of the vessel. Transducer 14 is excited over a range of frequencies near a wall resonance of the container such that a response is generated in the liquid. Since D and the speed of sound c of the liquid are fixed, $\Delta f$ in Eq. 3 is a constant, and the presence or absence of spectral peaks having a spacing of $\Delta f$ indicates that fluid level 10 is above or below the position of transducer 14, respectively.

When no liquid is present, sound propagates through the air (or vapor above a liquid surface) with difficulty because of the very high acoustic impedance mismatch between the solid wall and the gas. In principle, however, it is possible to observe resonances generated in the gas, but such signal levels are orders of magnitude smaller than those generated in a liquid when a liquid is present.

Additionally, when sound passes through a liquid and a standing wave resonance pattern is generated, there is a minimum signal level in the resonance pattern which is related to the acoustic impedance mismatch between the wall and the liquid. The closer the values of acoustic impedances are, the higher the observed minimum signal (that is, above a zero value). Since the acoustic impedance (density times sound speed) of most liquids is orders of magnitude greater than that for a gas (principally because of the large difference in density), the observed magnitude of the minimum value of the resonance pattern when a liquid is present is higher than the signal observed when air or another gas is situated on the inside of the container. Therefore, in addition to the presence or absence of periodic patterns, one can also observe the level of the detected signal in order to determine the presence or absence of the liquid. As an example, one can observe the average or root-mean-square value of the detected signal and set a threshold value for the determination of presence of liquid. Of course, if a periodic signal characteristic of liquid is observed, a liquid must be present.

Figure 5:
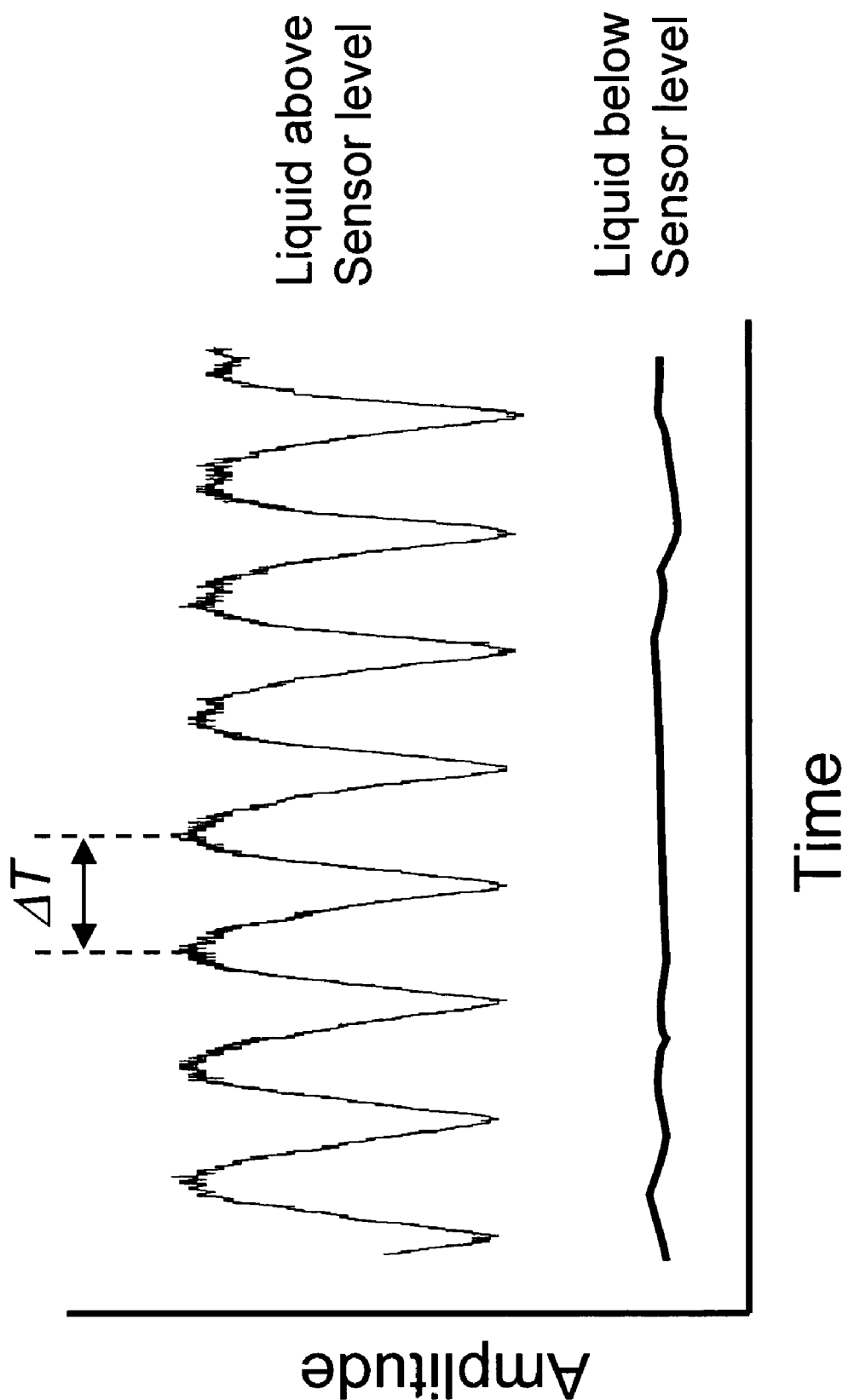
FIG. 5 is a graph showing two signals obtained from a point level sensor, there being no periodic return when the liquid is below the sensor level implying the lack of fluid at the level of the sensor, while when the liquid level is above the sensor, a resonance return is obtained having spacing $\Delta T$.

FIG. 5 is a graph showing two signals obtained from a point level sensor excited using pattern of Eq. 4. As is readily observed, there is no observed periodic response when the liquid is below the sensor level, while a resonance return is obtained having spacing $\Delta T$, when the liquid level is above the sensor.

An apparatus for pseudo-continuous level monitoring is shown in FIG. 6. Several point sensors 14a–14f are disposed on the wall of the container. This arrangement yields discrete level measurements. A liquid level is determined as being between two transmitter/receiver pairs, say between 14b and 14c when at one pair, 14c, resonance peaks having spacing $\Delta f$ are observed, while at the adjacent location, 14b, resonance peaks having spacing $\Delta f$ are not observed, or are observed with significantly reduced amplitude.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for measuring the level of a liquid having a surface in contact with a gas in a container, which comprises in combination:
   (a) a transducer in physical contact with the outside of a wall of the container located below the surface of the liquid for generating at least two acoustic resonance responses in the liquid substantially perpendicular to the surface;
   (b) a sweep generator for electrically exciting said transducer over a chosen range of acoustical frequencies and having a chosen waveform; and
   (c) a receiver for measuring the acoustic frequencies for at least two resonant responses, whereby the level of the liquid is determined from the frequency difference between the frequencies of the resonant responses.

2. The apparatus for measuring liquid level in a container as described in claim 1, wherein the chosen waveform comprises a sine wave.

3. The apparatus for measuring liquid level in a container as described in claim 2, wherein the at least two resonant responses are analyzed by Fast Fourier Transform procedures.

4. The apparatus for measuring liquid level in a container as described in claim 1, wherein the chosen range of acoustical frequencies includes at least one acoustic wall resonance.

5. The apparatus for measuring liquid level in a container as described in claim 1, wherein the chosen waveform comprises a continuous frequency modulated waveform voltage excitation, V(t), having the form $$V(t) = \sin\left(2\pi\left(f_o + \frac{1}{2}\alpha t\right)t\right),$$

where t is the time, $f_o$ is the initial frequency of the swept waveform, and $\alpha$ is related to the rate of change of the instantaneous frequency, whereby a time-dependent response is produced in the liquid from which the liquid level is determined.

6. An apparatus for measuring the level of a liquid having a surface in contact with a gas in a container, which comprises in combination:
   (a) means in physical contact with the outside of a wall of the container located below the surface of the liquid for generating at least two acoustic resonance responses in the liquid substantially perpendicular to the surface, and for determining the acoustic frequencies of at least two resonant responses; and
   (b) means for electrically exciting said means for generating at least two acoustic resonance responses over a chosen range of acoustical frequencies and having a chosen waveform, whereby the level of the liquid is determined from the frequency difference between the frequencies of the resonant responses.

7. The apparatus for measuring liquid level in a container as described in claim 6, wherein said means for generating at least two acoustic resonance responses and for determining the acoustic frequencies of at least two resonant responses comprises an acoustic transducer and an acoustic receiver.

8. The apparatus for measuring liquid level in a container as describe in claim 6, wherein said means for electrically exciting said means for generating at least two acoustic resonance responses comprises a sweep generator.

9. The apparatus for measuring liquid level in a container as described in claim 6, wherein the chosen waveform comprises a sine wave.

10. The apparatus for measuring liquid level in a container as described in claim 9, wherein the at least two resonant responses are analyzed by Fast Fourier Transform procedures.

11. The apparatus for measuring liquid level in a container as described in claim 6, wherein the chosen range of acoustical frequencies includes at least one acoustic wall resonance.

12. The apparatus for measuring liquid level in a container as described in claim 6, wherein the chosen waveform comprises a continuous frequency modulated waveform voltage excitation, V(t), having the form $$V(t) = \sin\left(2\pi\left(f_o + \frac{1}{2}\alpha t\right)t\right),$$

where t is the time, $f_o$ is the initial frequency of the swept waveform, and $\alpha$ is related to the rate of change of the instantaneous frequency, whereby a time-dependent response is produced in the liquid from which the level is determined.

13. A method for measuring the level of a liquid having a surface in contact with a gas in a container, which comprises the steps of:
   a. generating at least two acoustic resonances in the liquid substantially perpendicular to the surface of the liquid; and
   b. determining the frequency of at least two acoustic resonances, whereby the level of the liquid is determined from the frequency difference between the frequencies of the acoustic resonances.

14. The method for measuring liquid level in a container as described in claim 13, wherein the acoustic resonances are generated using a waveform comprising a sine wave.

15. The method for measuring liquid level in a container as described in claim 14, wherein the sine wave is swept over frequencies comprising at least one acoustic wall resonance of a wall of the container perpendicular to the surface of the liquid.

16. The method for measuring liquid level in a container as described in claim 13, wherein the acoustic resonances are generated using a waveform comprising a continuous frequency modulated waveform voltage excitation, V(t), having the form:

$$V(t) = \sin\left(2\pi\left(f_o + \frac{1}{2}\alpha t\right)t\right),$$

where t is the time, $f_o$ is the initial frequency of the swept waveform, and $\alpha$ is related to the rate of change of the instantaneous frequency, whereby a time-dependent response is produced in the liquid from which the liquid level is determined.

17. An apparatus for measuring the level of a liquid having a surface in contact with a gas in a container, which comprises in combination:
   (a) a transducer in physical contact with the outside of a wall of the container located below the surface of the liquid for generating acoustic resonance responses in the liquid substantially parallel to the surface;

(b) a generator for electrically exciting said transducer; and (c) a receiver for detecting the presence of resonant responses from the liquid, whereby if no resonant responses are detected, the level of the liquid is below said transducer.

18. An apparatus for measuring the level of a liquid having a surface in contact with a gas in a container, which comprises in combination:
   (a) means in physical contact with the outside of a wall of the container located below the surface of the liquid for generating acoustic resonance responses in the liquid substantially parallel to the surface, and for detecting resonant responses; and
   (b) means for electrically exciting said means for generating acoustic resonance responses, whereby if no resonance responses are detected, the level of the liquid is below said means for detecting resonant responses.

19. An apparatus for measuring the level of a liquid having a surface in contact with a gas in a container, which comprises in combination:
   (a) means in physical contact with the outside of a wall of the container located below the surface of the liquid for generating acoustic resonance responses in the liquid substantially parallel to the surface;
   (b) means for electrically exciting said means for generating acoustic resonance responses; and
   (c) means for detecting the presence of resonant responses from the liquid, whereby if no resonant responses are present, the level of the liquid is below said means for detecting the presence of resonant responses.

20. A method for measuring the level of a liquid having a surface in contact with a gas in a container, which comprises the steps of:
   (a) generating at least two acoustic resonances in the liquid substantially parallel to the surface of the liquid; and
   (b) detecting the presence of acoustic resonances from the liquid whereby if no acoustic resonances are detected, the level of the liquid is below a location where said step of generating at least two acoustic resonances in the liquid can be performed.

* * * * *